(12) United States Patent
Tari et al.

(10) Patent No.: US 7,840,474 B1
(45) Date of Patent: Nov. 23, 2010

(54) METHOD AND SYSTEM FOR MANAGING REQUESTS FOR PROPOSALS FOR ELECTRONIC TRADING OF FINANCIAL INSTRUMENTS

(75) Inventors: Michael J. Tari, New York, NY (US); Angelo M. Toglia, Cos Cob, CT (US); Christopher J. Dias, Bloomfield, NJ (US); Darius Gagne, New York, NY (US); Michiya Handa, New York, NY (US); Neil A. Chriss, New York, NY (US); Jeffrey R. Larsen, Greenwich, CT (US)

(73) Assignee: ICor Brokerage, Inc., New York, NY (US)

( * ) Notice: Subject to any disclaimer, the term of this patent is extended or adjusted under 35 U.S.C. 154(b) by 1253 days.

(21) Appl. No.: 10/014,864

(22) Filed: Dec. 11, 2001
(Under 37 CFR 1.47)

Related U.S. Application Data

(60) Provisional application No. 60/254,680, filed on Dec. 11, 2000.

(51) Int. Cl.
*G06Q 40/00* (2006.01)
(52) U.S. Cl. .......................... 705/37; 705/35
(58) Field of Classification Search ................... 705/35, 705/37
See application file for complete search history.

(56) References Cited

U.S. PATENT DOCUMENTS

| 3,573,747 | A | 4/1971 | Adams et al. |
| 4,412,287 | A | 10/1983 | Braddock, III |
| 4,486,853 | A | 12/1984 | Parsons |
| 4,554,418 | A | 11/1985 | Toy |
| 4,674,044 | A | 6/1987 | Kalmus et al. |
| 4,677,552 | A | 6/1987 | Sibley, Jr. |
| 4,942,616 | A | 7/1990 | Linstroth et al. |
| 4,980,826 | A | 12/1990 | Wagner |
| 5,038,284 | A | 8/1991 | Kramer |

(Continued)

FOREIGN PATENT DOCUMENTS

EP 0411748 A2 2/1991

(Continued)

OTHER PUBLICATIONS

Flex Options, Chicago Board Options Exchange, found at http://cboe.com/Institutional/IndexFlex.aspx.*

(Continued)

*Primary Examiner*—Stefanos Karmis
*Assistant Examiner*—James A Vezeris
(74) *Attorney, Agent, or Firm*—Eugene S. Indyk (57) ABSTRACT

A method and system for electronically trading financial instruments is disclosed. In one embodiment of the disclosed invention, traders generate requests for proposals ("RFPs") on financial instruments. The RFPs are broadcast to traders whose tradeable structures include the RFP structure. During a response phase, traders may respond to the RFP. These responses are preferably broadcast to all traders who have responded, as well as the requestor. Preferably, only the requestor may trade on the responses during the response phase. Once the response phase expires, the system preferably enters an action phase during which all responders to the RFP and the requestor may trade on the responses. Once the action phase expires, the responses are migrated to the general market.

15 Claims, 9 Drawing Sheets

U.S. PATENT DOCUMENTS

| | | | |
|---|---|---|---|
| 5,077,665 | A | 12/1991 | Silverman et al. |
| 5,101,353 | A | 3/1992 | Lupien et al. |
| 5,136,501 | A | 8/1992 | Silverman |
| 5,214,579 | A | 5/1993 | Wolfberg et al. |
| 5,297,031 | A | 3/1994 | Gutterman et al. |
| 5,375,055 | A | 12/1994 | Togher et al. |
| 5,655,088 | A | 8/1997 | Midorikawa et al. |
| 5,689,652 | A | 11/1997 | Lupien et al. |
| 5,717,989 | A | 2/1998 | Tozzoli et al. |
| 5,724,524 | A | 3/1998 | Hunt et al. |
| 5,727,165 | A | 3/1998 | Ordish et al. |
| 5,774,880 | A | 6/1998 | Ginsberg |
| 5,802,499 | A | 9/1998 | Sampson et al. |
| 5,809,483 | A | 9/1998 | Broka et al. |
| 5,857,176 | A | 1/1999 | Ginsberg |
| 5,873,071 | A | 2/1999 | Ferrstenberg et al. |
| 5,905,974 | A | 5/1999 | Fraser et al. |
| 5,905,975 | A | 5/1999 | Ausubel |
| 5,915,209 | A | 6/1999 | Lawrence |
| 5,924,082 | A | 7/1999 | Silverman et al. |
| 5,924,083 | A | 7/1999 | Silverman et al. |
| 5,950,177 | A | 9/1999 | Lupien et al. |
| 5,963,923 | A | 10/1999 | Garber |
| 5,983,200 | A | 11/1999 | Slotznick |
| 5,987,419 | A | 11/1999 | Hachino et al. |
| 6,012,046 | A | 1/2000 | Lupien et al. |
| 6,014,627 | A | 1/2000 | Togher et al. |
| 6,014,643 | A | 1/2000 | Minton |
| 6,014,644 | A | 1/2000 | Erickson |
| 6,016,483 | A | 1/2000 | Rickard et al. |
| 6,026,383 | A | 2/2000 | Ausubel |
| 6,035,287 | A | 3/2000 | Stallaert et al. |
| 6,055,519 | A | 4/2000 | Kennedy et al. |
| 6,058,379 | A | 5/2000 | Odom et al. |
| 6,119,101 | A | 9/2000 | Peckover |
| 6,131,087 | A * | 10/2000 | Luke et al. .................. 705/26 |
| 6,151,588 | A | 11/2000 | Tozzoli et al. |
| 6,317,727 | B1 | 11/2001 | May |
| 6,519,574 | B1 | 2/2003 | Wilton et al. |
| 2002/0002530 | A1 | 1/2002 | May |
| 2002/0116317 | A1* | 8/2002 | May .......................... 705/37 |
| 2002/0169703 | A1* | 11/2002 | Lutnick et al. ................ 705/37 |

FOREIGN PATENT DOCUMENTS

| | | |
|---|---|---|
| EP | 0512702 A2 | 11/1992 |
| EP | 0407026 B1 | 11/1995 |
| EP | 0399850 B1 | 12/1995 |
| WO | WO 99/19821 | 4/1999 |

OTHER PUBLICATIONS

Schmerken, Ivy, *Banks Eye Forex Matching Systems*, Wall Street Computer Review, vol. 9, No. 2, p. 45.

Wilson, John F., *On-Line International Cash Management*, Annual ACM Conference, 1983.

Burman, Michael, *Aspects of a High-Volume Production Online Banking System*, IEEE Compcon, Spring of 1985.

Sammer, Harald W., *Online Stock Trading Systems: Study of an Application*, IEEE Compcon, Spring of 1987.

Clemons, E.K., et al., Merrill Lynch Cash Management Account Financial Service: *A Case Study in Strategic Information Systems*, 21$^{st}$ Annual Hawaii International Conference on Systems Sciences, vol. 4, 1988.

Finebaum, Murray L., *Information Systems in the Securities Industry*, 21$^{st}$ Annual Hawaii International Conference on System Sciences, vol. 4, 1988.

Sager, M.T., *Competitive Alliances With Information Technology—The Australian Retail Banking Experience*, 22$^{nd}$ Annual Hawaii International Conference on System Sciences, vol. 4, 1989.

Gutner, Tarruni, *Fine If You're Big*, The Banker, Oct. 1988.

Arend, Mark, *Swift Speeds Up As Broker/Dealers Join*, Wall Street Computer Review, Jan. 1989.

Essinger, James, *ISE's 'SAEF' Debuts to Make the Market Sound*, Wall Street Computer Review, May, 1989.

Freund, William C., *Electronic Trading and Linkages in International Equity Markets*, Financial Analysis Journal, May-Jun. 1989.

Schmerken, Ivy, *High-Tech Banks Set to Challenge Wall Street*, Wall Street Computer Review, Jul. 1989.

Arend, Mark, *Banks Lure Investors With High-Tech Convenience*, Wall Street Computer Review, Dec. 1989.

Arend, Mark, *Where Wall Street's Tending In Trading Systems Design*, Wall Street Computer, Jun. 1990.

Brennan, P.J., *OTC Trading Systems Lead In Race to Automate*, Wall Street Computer Review, Nov. 1990.

Cody, B.J., *Reducing the Costs and Risks of Trading Foreign Exchange*, Wall Street Computer Review, Nov. 1990.

Goodman, Ann, *The Monep: Mixing Men and Machines for Market Might*, Wall Street Computer Review, Aug. 1991.

Heyman, D.P., *A Performance Model of the Credit Manager Algorithm*, Computer Networks and ISDN Systems, Mar. 1992.

*Method for Collection of Accounting Data*, IBM Technical Disclosure Bulletin, 1986.

*Banks Look to Build FX Order- Matching System Quotron Eyed as Vendor, Mines as Co-Sponsor?*, FX Week, May 17, 1991.

*TST Interviews* Evan Schulman, Automated Trading Pioneer, Trading Systems Technology, Jul. 15, 1991.

Schmerken, Ivy, *Staying in the Middle: . . . Brokers Are Fighting to Keep Their Role in the Market; Includes Related Article on Crossing Networks*, Wall Street Computer Review, Dec. 1991.

Jeffries, AZX, *Others Team With Buy-Side Software System*, Wall Street Letter, Jun. 8, 1992.

*Proprietary Execution: Minex Secures Asian Support for Order-Matching System*, Trading Systems Technology, Jan. 27, 1992.

*Proprietary Execution: Quotron, EBS Demo Prototype of Forex Order-Matching System*, Trading Systems Technology, Nov. 4, 1991.

*Eleven Banks, Quotron Unveil EBS Demo Anonymous Forex Order-Matching System*, FX Week, Nov. 1, 1991.

Keith, C., *The Overdue Revolution; Equity Trading in the Post-Electronic Age: A Working Plan for a Customer-Based System*, Investment Dealer's Digest, Sep. 30, 1991.

Fingelton, E., *Tokyo Takes on Reuters in the Race to Wire the Forex World*, International Japan Journal, p. 35, Dec. 1990.

Arend, M., *New Systems Lighten Load on Bank Securities Wings; Warrington Financial Systems' Broker-Dealer Module for the Firm's Bond On-Line Trading System Meets Needs of Section 20 Subsidiaries of Banks*, Wall Street Computer Review, Nov. 1990.

*VAX-II Version of "IBIS" Released by Tymshare*, Computer World, May 9, 1983.

Capitol Hill Hearing Testimony, Shawn A. Dorsch, Pres. & CEO of Derivatives Net, Inc., Senate Banking, Housing & Urban Affairs Changing Financial Markets, May 8, 2000.

Perkins, Fred J., *Nordex: Automated Trading for Nordic Equities*, Computers in the City '89, London, Nov. 1989.

Money Match: Functional Specification, Version 1, Aug. 1990.

LIFFE Manual: *How the Market Works* 3$^{rd}$ Edition—Feb. 2000.

\* cited by examiner

ACTION SCREEN - USD SWAPTION
Trade | New Order | Query | Query Response | Edit Order | RFP | RFP Response Expiry    1.00    04/18/01    04/20/01    Calendar
Tenor     5.00                                        04/21/06    Roll    20
Strike    7.40    ATM ◆ Straddle / Receiver / Payer    ◆ Euro / Berm / BES Request For Price
Status          Size    Bid    Offer    Size    Status
Live Only ▼     100           /          100    Live Only ▼

Submit RFP                                              Close Window

• Live Only
• Live or ABC 302, 304, 306, 308, 310, 312, 314, 316, 318, 320

METHOD AND SYSTEM FOR MANAGING REQUESTS FOR PROPOSALS FOR ELECTRONIC TRADING OF FINANCIAL INSTRUMENTS

CROSS-REFERENCE TO RELATED APPLICATION

This application claims the benefit, under 35 U.S.C. §119, of U.S. Provisional Application No. 60/254,680, entitled "Method And System For Requesting Prices For Electronic Trading Of Financial Instruments," filed Dec. 11, 2000, which is incorporated herein by reference.

FIELD OF THE INVENTION

This invention relates to computerized brokerage systems and, more particularly, to the electronic trading of financial instruments via an electronic trading system.

BACKGROUND

Market prices for certain types of financial instruments, such as those listed in Tables 1A-1C, can change quite significantly in very brief periods of time. However, because such instruments are oftentimes thinly traded, on many occasions there may be no offers to buy ("bids") or offers to sell ("offers") for a particular financial instrument (also called "products" herein). Although traders may be interested in buying and/or selling such instruments they may not wish to place bids or offers. Instead, they wish to have other traders make bids and/or offers on the particular instrument.

Thus, there exists a need for a method and system which allows traders to jump start a market, without exposing the traders to the risk associated with placing bids and/or offers.

TABLE 1A

F/X Products
   Options
      Vanilla and Currency Pair (USD/JPY, GBP/USD, etc.)
         Calls (European, American, etc.)
         Puts (European, American, etc.)
         Risk Reversals and Straddles (European, American, etc.)
         Strangles (European, American, etc.)
      Exotic and Currency Pair
         Knock-ins/outs (calls, puts, etc.)
         Reverse knock ins/outs (calls, puts, etc.)
   Forwards
      Currency Pair
         Spot starting
         Forward starting
   Currency Pair (i.e. Spot) Transactions

TABLE 1B

Fixed Income Products
   Swaps
      Currency (USD, JPY, GBP, etc.)
         Swap spreads (traded with treasury hedge)
         All-in rate swaps
         Spread switches
         All-in-rate switches
   Basis Swaps
      Currency
         1-3/3-6/1-6 month basis swaps (London Interbank Offered Rate ("LIBOR"), Tokyo Interbank Offered Rate ("TIBOR"), etc.)
         CP-3 month basis swaps (LIBOR, TIBOR, etc.)
   Forward Rate Agreements
      Currency
         1/3/6 month (LIBOR, TIBOR, etc.)

TABLE 1B-continued

FRA Switches (LIBOR, TIBOR, etc.)
   Swaptions
      Currency
         European (payer, receiver, straddle, etc.)
         Bermudan (payer, receiver, straddle, etc.)
         Bermudan-European Switches (payer, receiver, straddle, etc.)
   Caps/Floors
      Currency
         Cap/Floor, Straddle (LIBOR, TIBOR, etc.)
         Digital Cap/Floor (LIBOR, TIBOR, etc.)
   Convexity Products
      Currency
         Cap/Floor, Straddle (CMS/CMT 2, 5, 10, 30 year tenors, etc.)
         Rolling Spread Locks against a spot hedge
         Rolling Spread Locks quoted outright

TABLE 1C

Equity Products
   Options
      Vanilla and Underlying (IBM, S&P 500, etc.)
         Calls (European, American, etc.)
         Puts (European, American, etc.)
         Straddles (European, American, etc.)
      Exotic and Underlying
         Calls
         Puts
         Straddles
   Forwards
      Underlying
         Spot starting
         Forward starting
   Underlying (i.e. Stock/Index) Transactions

SUMMARY OF THE INVENTION

These and other limitations of the prior art are addressed in the present invention which is a system and method of electronically trading financial instruments ("instruments").

In accordance with one aspect of the invention, requests for proposals ("RFPs") for instruments are accepted and broadcast to traders. During a response phase, traders may respond to the RFP. Responses are preferably posted to all traders who have responded, as well as the requestor. During the response phase, only the requestor may trade on the responses. Once the response phase expires, the system preferably enters an action phase during which all responders and the requestor may trade on the responses. Once the action phase is ended, the open responses are added to the general market.

DETAILED DESCRIPTION OF THE INVENTION

With reference to FIGS. 1-8 a preferred embodiment of the invention is discussed. FIG. 1A shows an exemplary trading system implementing the present invention. A plurality of trader stations 102, 104 and 106 are connected to a financial server 100 through a network 110. The network 110 is preferably a private network connected through any number of means, such as T1 lines, digital subscriber lines, cable modems, satellite links, or other available connection means. One or more associated trader stations 106 may be coupled via a local area network 112. A trading system administrator station 114 also is preferably coupled to the financial server 100. Alternatively, trader stations 102, 104 and 106 may be coupled to server 100 through any of a number of means, such as via a public network, such as the Internet, or via a virtual private network. The system preferably utilizes a client-server architecture in which the trader stations 102, 104 and 106 execute a thin-client written in Java to communicate with the financial server 100. In an alternate embodiment, the financial server 100 acts as a web server and communicates with trader stations 102, 104 and 106 using a page description language, such as Hyper-Text Markup Language ("HTML" or Extensible Markup Language ("XML"). In such an embodiment, traders interact with server 100 using a compatible browser (e.g., Netscape Navigator® or Microsoft Internet Explorer®).

Figure 1A:
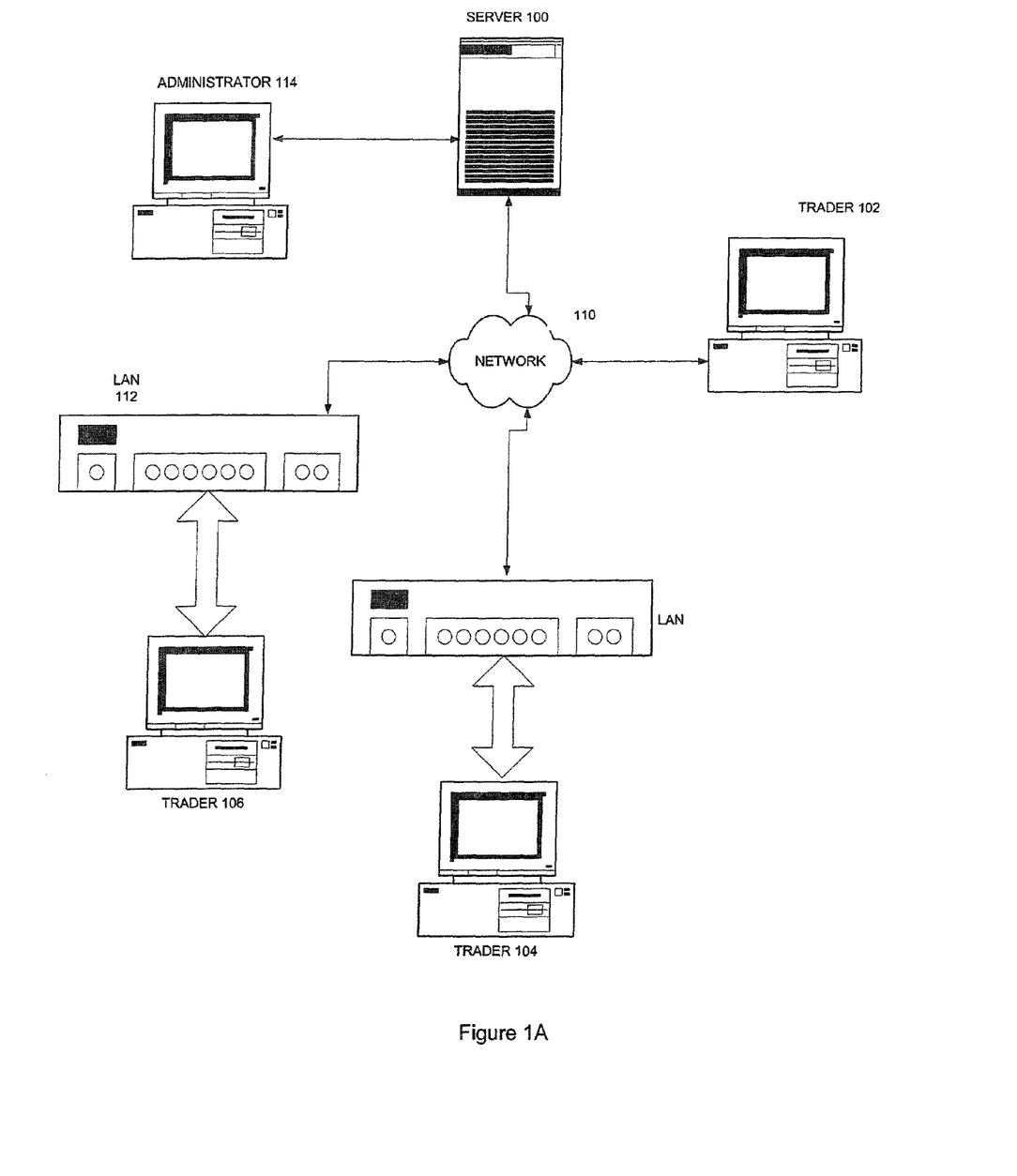
FIG. 1A is a schematic of an exemplary computer network implementing the invention.
Figure 1B:
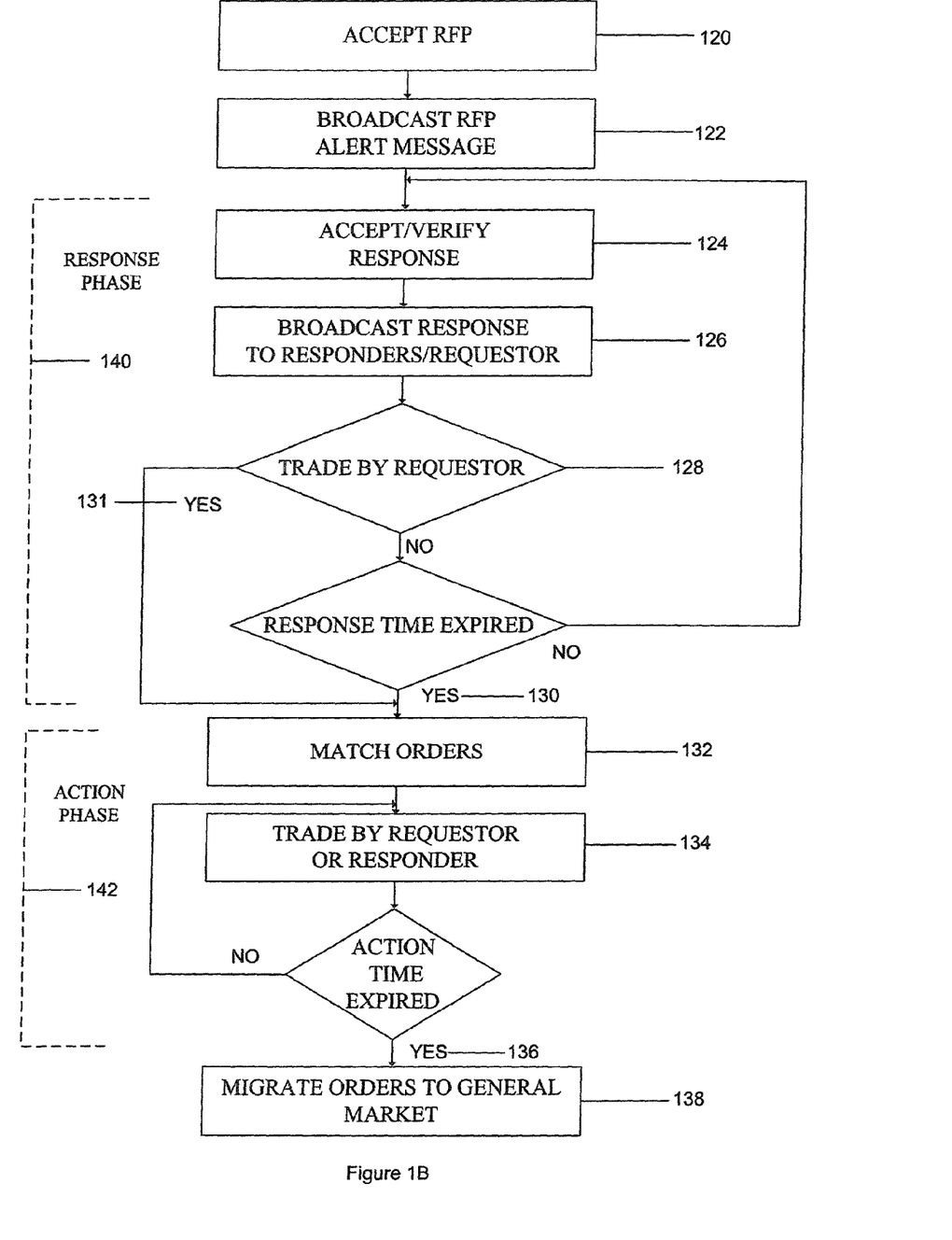
FIG. 1B is an overview flowchart of a process implementing the present invention.

FIG. 1B shows an overview flowchart of a process implementing one embodiment of the present invention. FIGS. 2-8 show exemplary user interface screens for trader workstations utilized in creating and responding to requests for prices on financial instruments.

Figure 2:
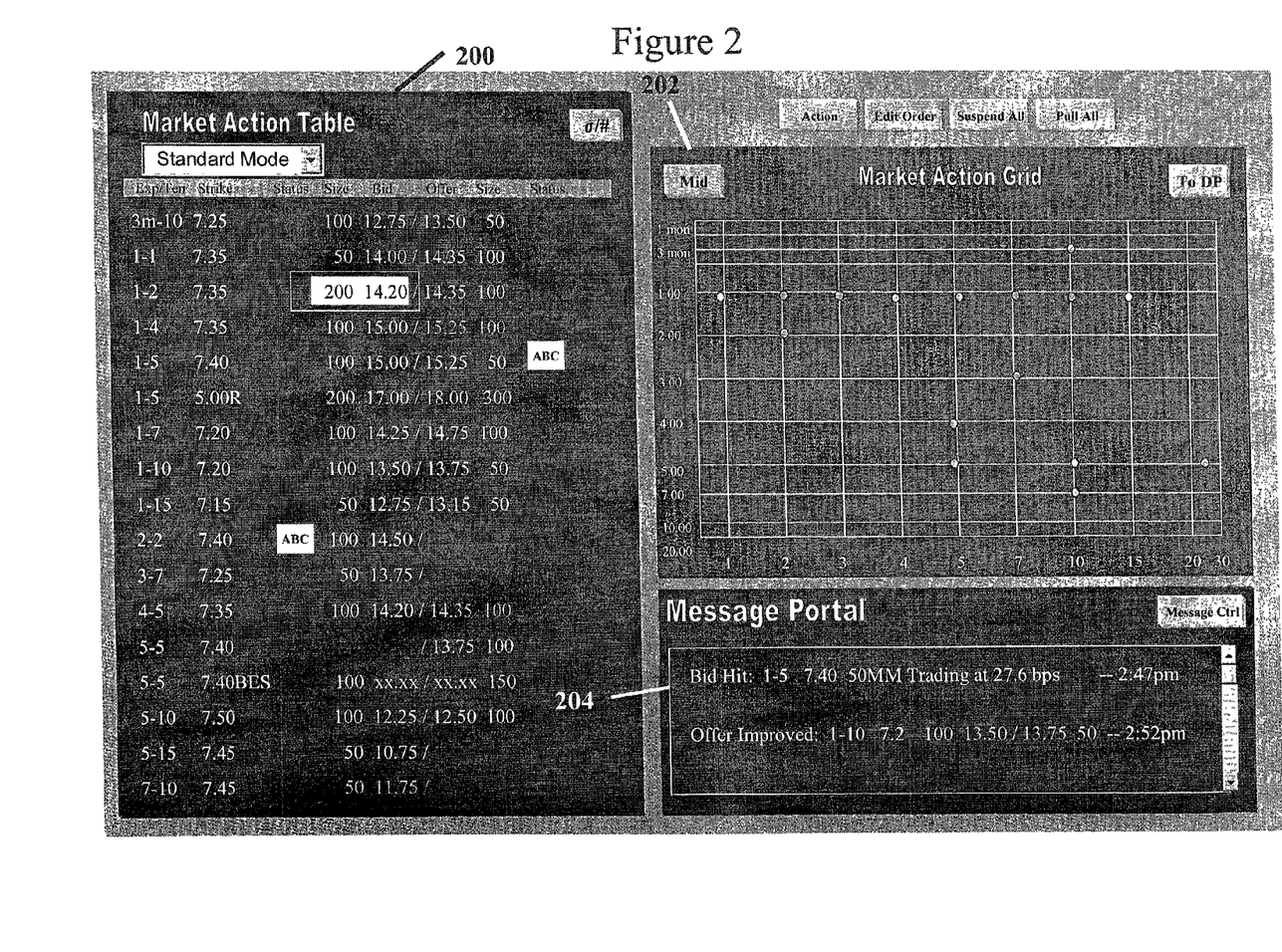
FIG. 2 shows an exemplary market action screen of a trader display with a market action table in standard mode.

In one embodiment of the invention, traders are presented with a Market Action Screen ("MAS") as shown in FIG. 2. The MAS contains a Market Action Table ("MAT") 100 which shows orders (i.e. bids orders and offer orders) for certain instruments on the system. An order has a price, size and instrument (collectively, a "structure") associated with it. The MAT 200 can be viewed in different modes in order to view different types of orders. For example, Standard Mode, shown in FIG. 2, preferably shows the "inside market" (i.e. the best bid and best offer) for all structures including live orders, ABC orders (discussed below) and RFP orders; and RFP Table Mode (shown in FIG. 4) preferably shows orders for which there is an RFP and also displays the inside market. Each row in the MAT 200 represents a different financial instrument. The MAT 200 preferably includes a bid column and an offer column which display the "best" bid or offer, respectively, for each instrument, where "best" is preferably defined in terms of price, but could, in alternate embodiments, be defined by other parameters, such as size or structure of the order. The MAS also contains a Market Action Grid 202, which is a graphical representation of information in the MAT 200, and a Message Portal 204 which keeps traders abreast of system activity (e.g. trades, new orders, requests for prices, etc.) by displaying various messages.

Message Portal 204 preferably displays messages which are relevant to the traders' positions. In the preferred embodiment, various intensities of messages are available. For example, level 1 messages (the lowest level of intensity) are presented in standard text; level 2 messages (mid-level of intensity) are presented in large text size, e.g. 1.5×standard text size; and level 3 messages (the highest level of intensity) are presented in a larger text size, e.g. 2×standard text size, and may, optionally, be sent twice, the second message immediately following the first, and may be accompanied by an audio indication, such as a beep sound. Color/blinking indications (e.g. level 1=green, level 2=red, level 3=blinking red) may also be used. Alternatively, use of color may be reserved to indicate credit status. Messages may alternatively be sent via e-mail, Internet instant messaging, paging, telephonic (voice notifications and/or voice mails), pager and/or mobile messaging systems, such as WAP.

Figure 3:
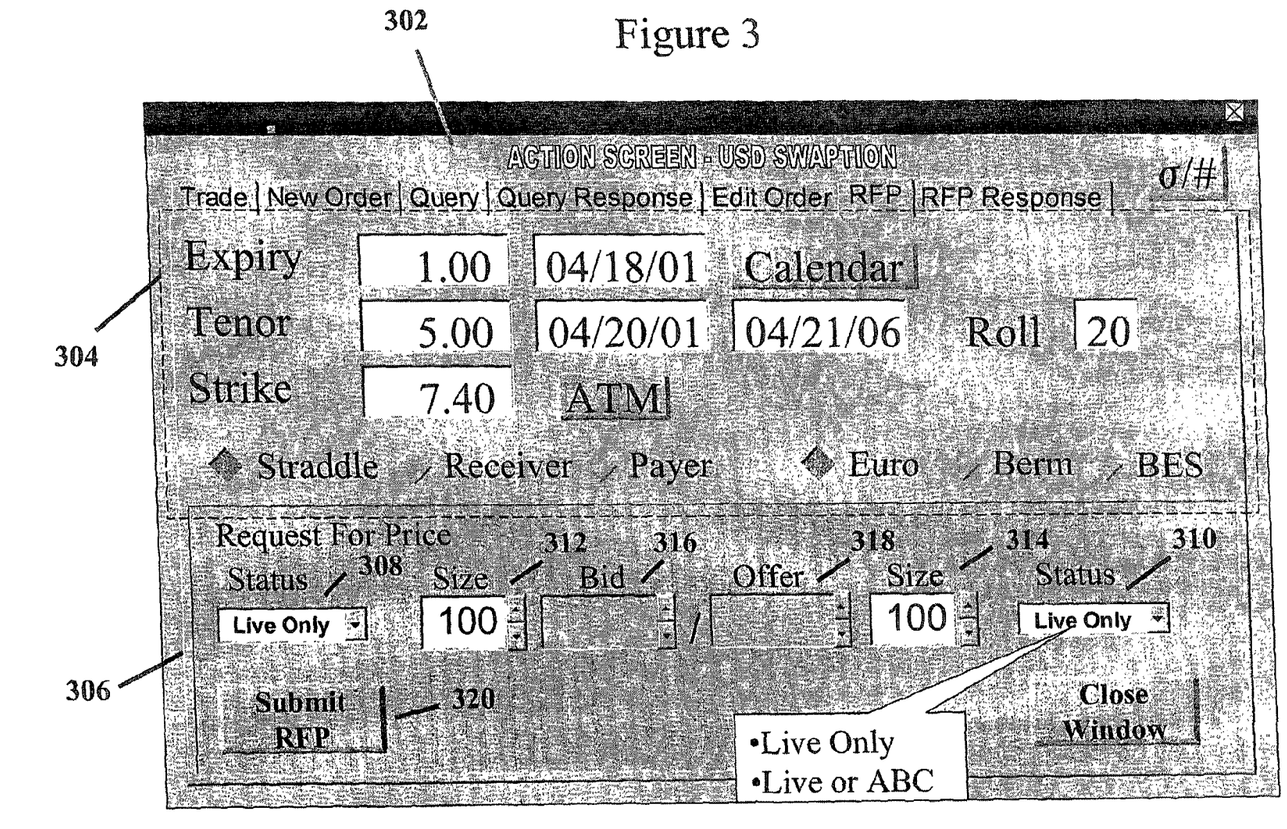
FIG. 3 shows an exemplary trader display screen for entering a request for proposal.

A preferred interface for creating an RFP order is shown in FIG. 3. The trader enters the structure he or she is interested in obtaining a price for (the "RFP structure") in the Structure Sub-Section 304 of the Action Screen 302 shown in FIG. 3. The RFP structure preferably includes the expiry, tenor and strike price of the instrument. The trader also enters the size 312, 314; direction 316, 318 and status 308, 310 of the RFP using the Action Sub-Section 306 of Action Screen 302. The size 312, 314 may be below a default minimum, depending on the instrument. The direction 316, 318 indicates whether the trader wants bids 316, offers 318 or both (a "two-way"). For a two-way, the requested bid size and offer size may differ and the requested bid status and offer status may also differ. The status 308, 310 indicates whether the trader will accept only Live (i.e. market) orders or accept both Active But Confirm ("ABC") and Live orders 308, 310. An ABC order is subject to confirmation by the owner of the order before the trade may be finalized. The trader clicks the Submit RFP button 320 to enter the RFP into the system. The system then checks the RFP and enters it into the system (120 FIG. 1B).

In a preferred embodiment of the invention, a trader may enter an RFP for a structure, direction and size, even if an RFP for the same structure, direction and size has already been entered in the system. Additionally, a trader may enter an RFP for a structure, direction and size which already has a standard order placed for the structure, direction and size. If there already exists a Live or ABC price for the structure, the system preferably warns the requestor that the structure is on the general market and request confirmation to submit the RFP.

Figure 4:
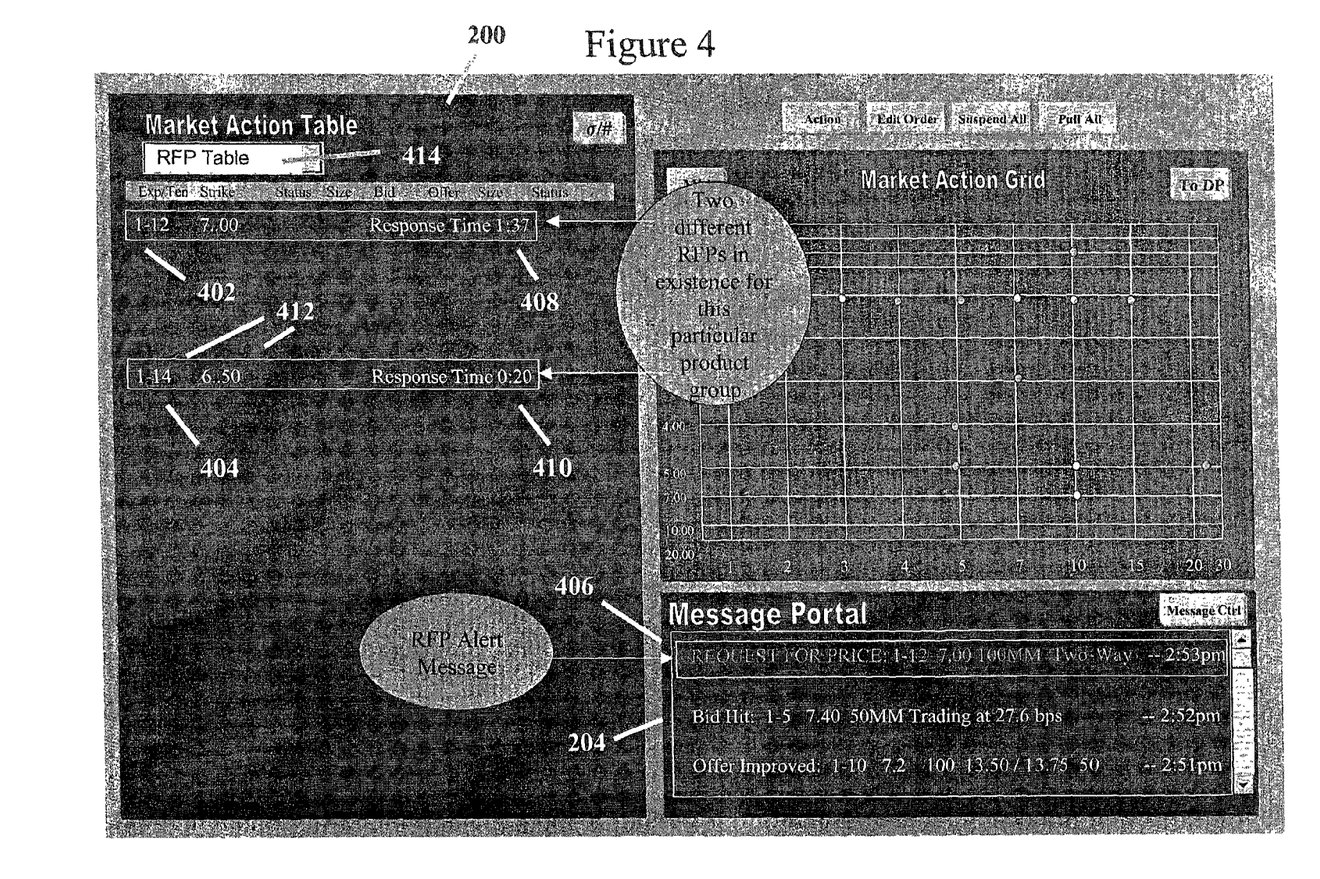
FIG. 4 shows an exemplary market action screen of a trader display with a market action table in request for proposal mode.

Each RFP order is preferably associated with a Response Time (408 FIG. 4). This is preferably initialized to a system default, but may, alternatively, be user set. After the Response Time expires users may not respond to the RFP order.

As shown in FIG. 4, once an RFP order has been generated by a trader, an RFP Alert Message 406 is broadcast (122 FIG. 1B) in Message Portals 204 alerting the system users that there has been an RFP. Preferably, the RFP Alert Messages 406 are only broadcast to traders whose tradeable structures include the RFP structure (tradeable structures preferably include all structures for which the trader's trading group is authorized to trade).

In one implementation, for each trader (trader, where x=1 to n traders), the system determines whether the structure of the action (structure$_{action}$) is included in trader$_x$'s tradeable products. If not, the next trader is evaluated (i.e. x is incremented). If the structure is in the trader's tradeable products, then an RFP Alert Message 406 is generated. Preferably the RFP Alert Message is assigned intensity level 2 and a message string is generated (step 424) as follows:

"[cause text]:[pre-structure header]][main structure header],[Size]MM[Direction][Status]REQUESTED [time]"

where, cause text="RFP";
pre-structure header=
   if the structure of the RFP is not in trader$_x$'s open screen group, i.e. if the structure is not in the currently open screen, display a pre-structure header, (e.g. USD, GBP, USD/JPY);
else BLANK;
main structure header=
   <display continuous material attributes of the structure, e.g. the information in the exp/ten and strike columns as shown in market action table 200 (e.g. 412 of FIG. 4)>;
size=size of the order requested by the owner of the RFP;
direction=
   "bid," "offer" or "two-way" depending on whether the RFP owner wishes to buy or sell the instrument;
status=
   if RFP owner is willing to accept ABC responses then "ABC", else BLANK; and
time=the time the Alert was generated (preferably right justified).

If the RFP is a two-way and different sizes or status are requested, the system will preferably generate two separate RFP Alert Messages. Alternately, the system simply generates two RFP Alert Messages for each two-way RFP.

As discussed above, the RFP structure is also preferably indicated 402, 404 in the MAT 200 when the MAT 200 is in RFP table mode 414 and the RFP structure is one of the types of structures being displayed. The MAT indication 402, 404 initially appears as a single line consisting of the structure header (the "RFP structure header") (shown as 412) and remaining response time. The RFP table mode 414 shows all RFPs in existence for a given product group. The RFP table 414 optionally shows additional lines depending on whether or not the trader has responded to the RFP. Preferably, a requestor's MAT 200 switches into RFP table mode 414 automatically when the trader submits an RFP. The requestor may switch back to any desired mode manually.

System users can respond to the RFP by clicking on the RFP Alert Message 406 in the Message Portal 204 or by clicking on the RFP structure 402, 404 in the MAT 200. Users must respond within the allotted Response Time (shown as 408 and 410).

Figure 5:
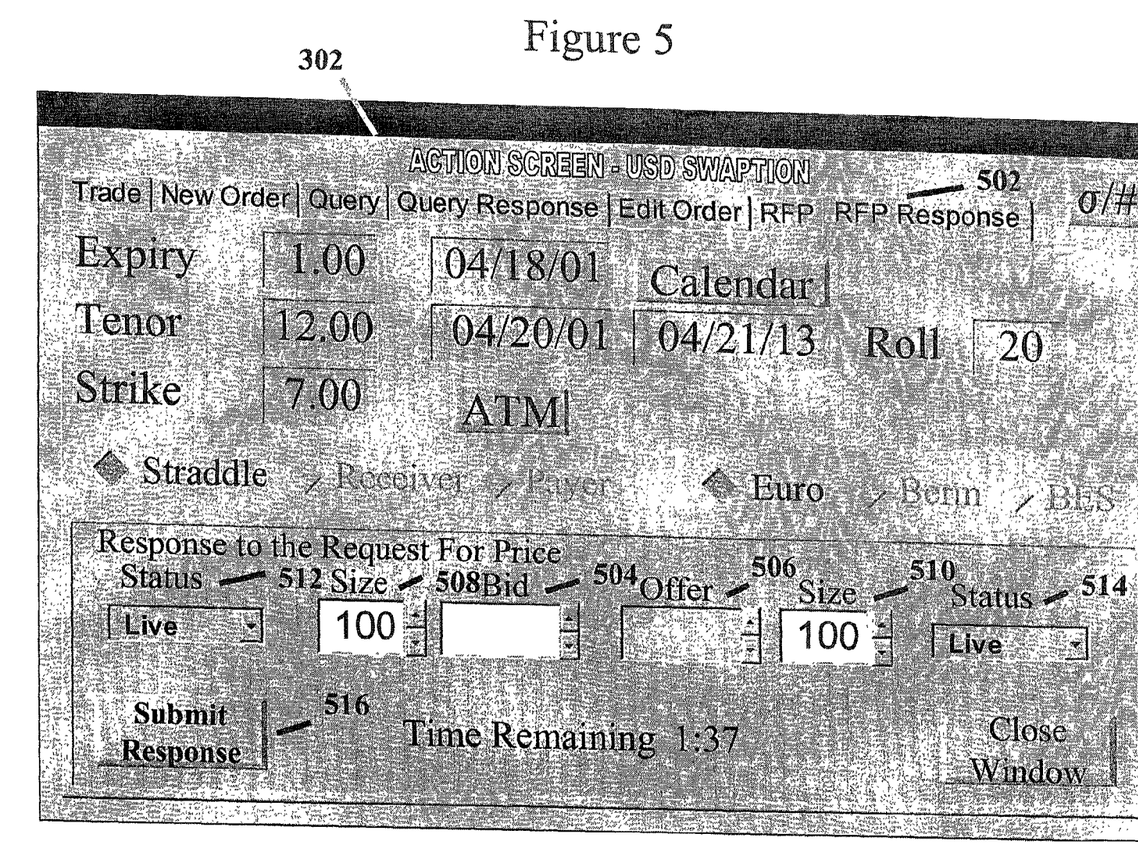
FIG. 5 shows an exemplary trader display screen for responding to a request for proposal.

Once a user indicates that they wish to respond to the RFP (such as by clicking the RFP Alert Message 406 or RFP structure 402, 404), they are presented with the RFP Response Tab 502 of the Action Screen 302 (FIG. 5) where they enter a price or prices. As shown in FIG. 5, the RFP response attributes include direction 504, 506, size 508, 510 and status 512, 514. Direction 504, 506: must be a bid if the RFP direction 316, 318 was bid; must be an offer if the RFP direction 316, 318 was offer; and in the preferred embodiment can be a bid, an offer or a two-way if the RFP direction 316, 318 was two-way. If the embodiment implements a default minimum size, any size not less than a default minimum is allowed for responses to non-sub-market size RFPs. If sub-market size RFPs are allowed, any size not less than a sub-market RFP size 312, 314 is preferably allowed. Preferably, bid size 508 and offer size 510 can differ for responses to two-way RFPs. Status 512, 514 must be Live if the RFP status 308, 310 was Live; can be Live or ABC if the RFP status 308, 310 was "Live or ABC". Preferably, bid status 512 and offer status 514 are allowed to differ for responses to two-way RFPs. The trader clicks the submit response button 516 to submit the response to the RFP to the system. The system accepts and verifies (124 FIG. 1B) the response.

Once a response to an RFP is submitted (newly or as an edit), the Responder's MAT 200 preferably switches to RFP table mode 414 (FIG. 4). The responder may manually switch back to any desired mode.

Figure 6:
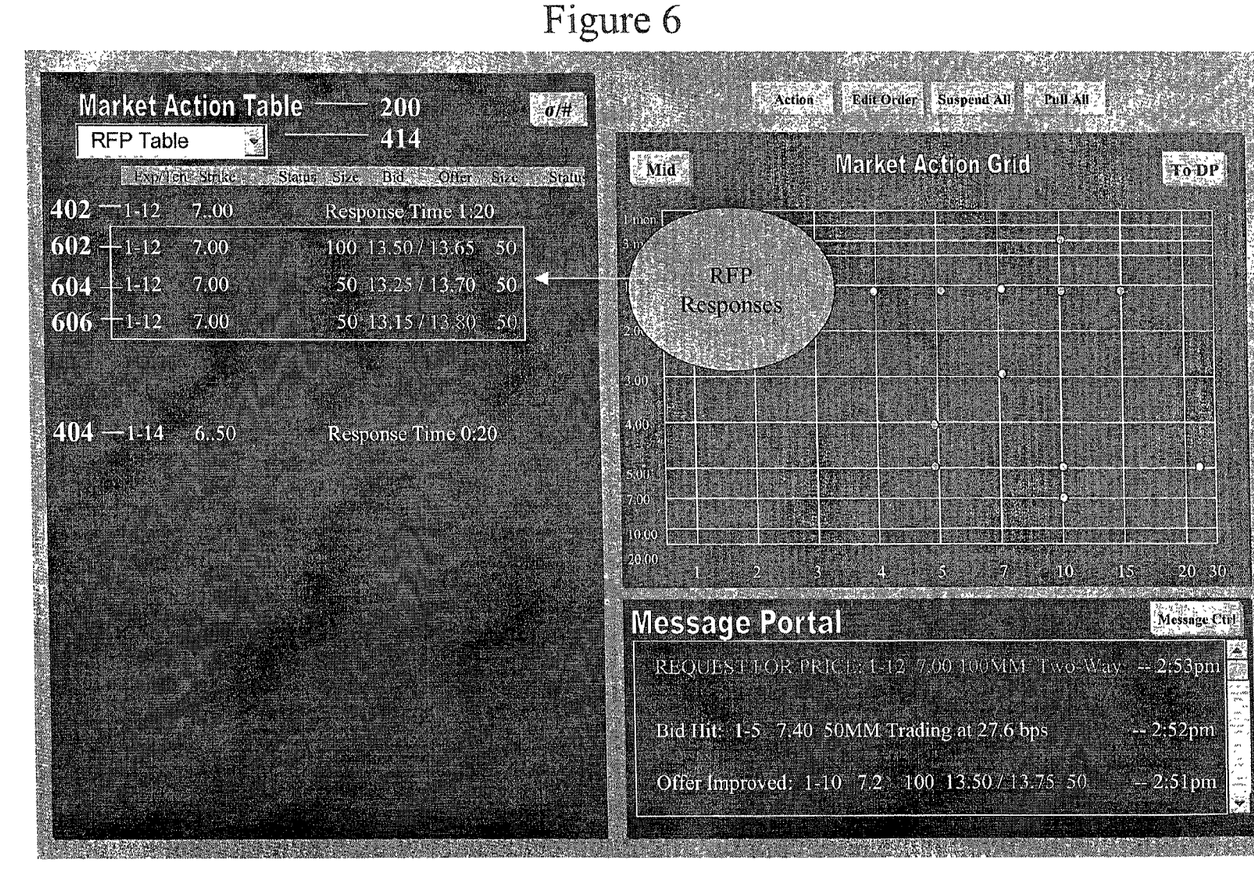
FIG. 6 shows an exemplary market action screen of a trader display showing responses to requests for proposals.
Figure 7:
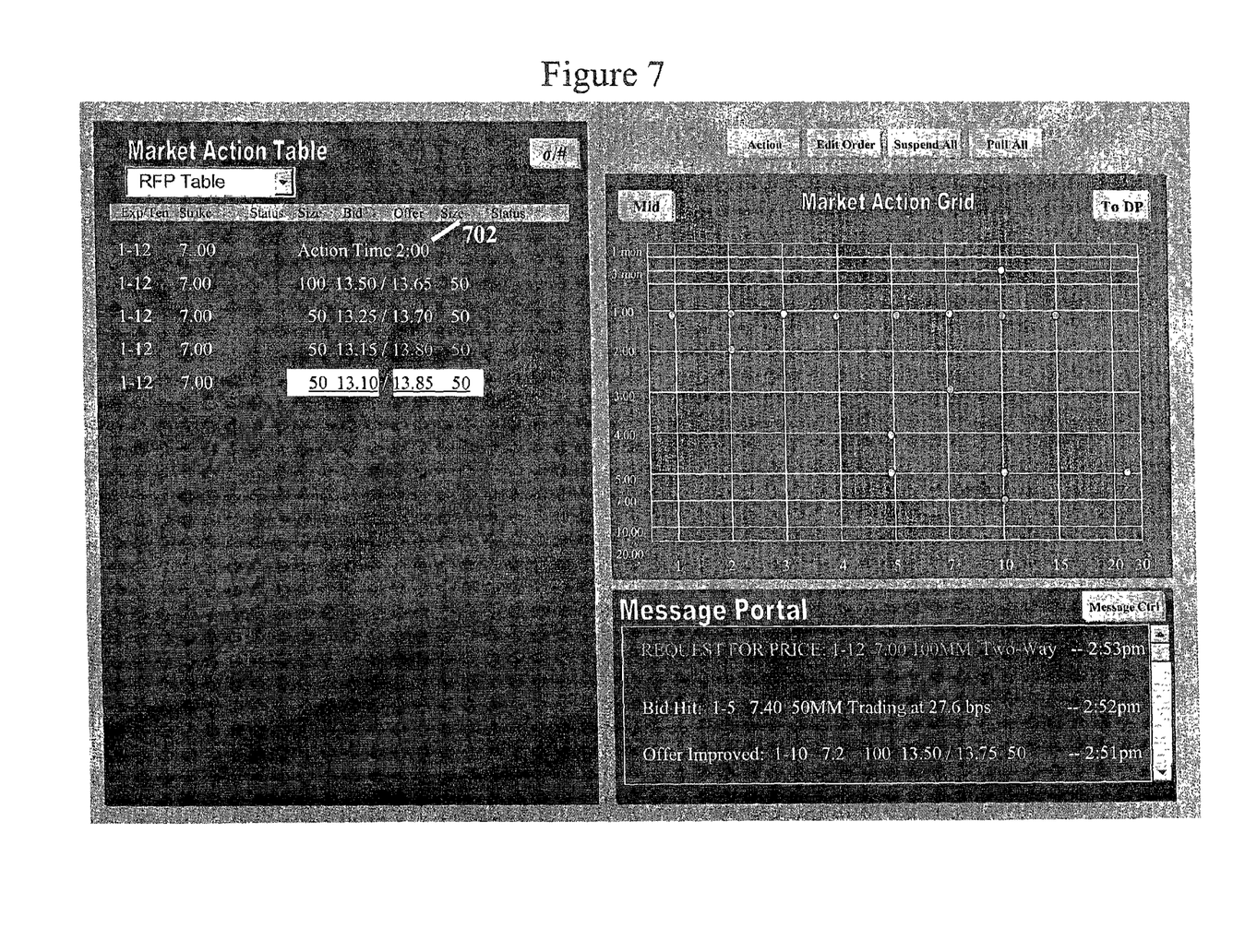
FIG. 7 shows an exemplary market action screen of a trader display showing an action time for trading on requests for proposals.
Figure 8:
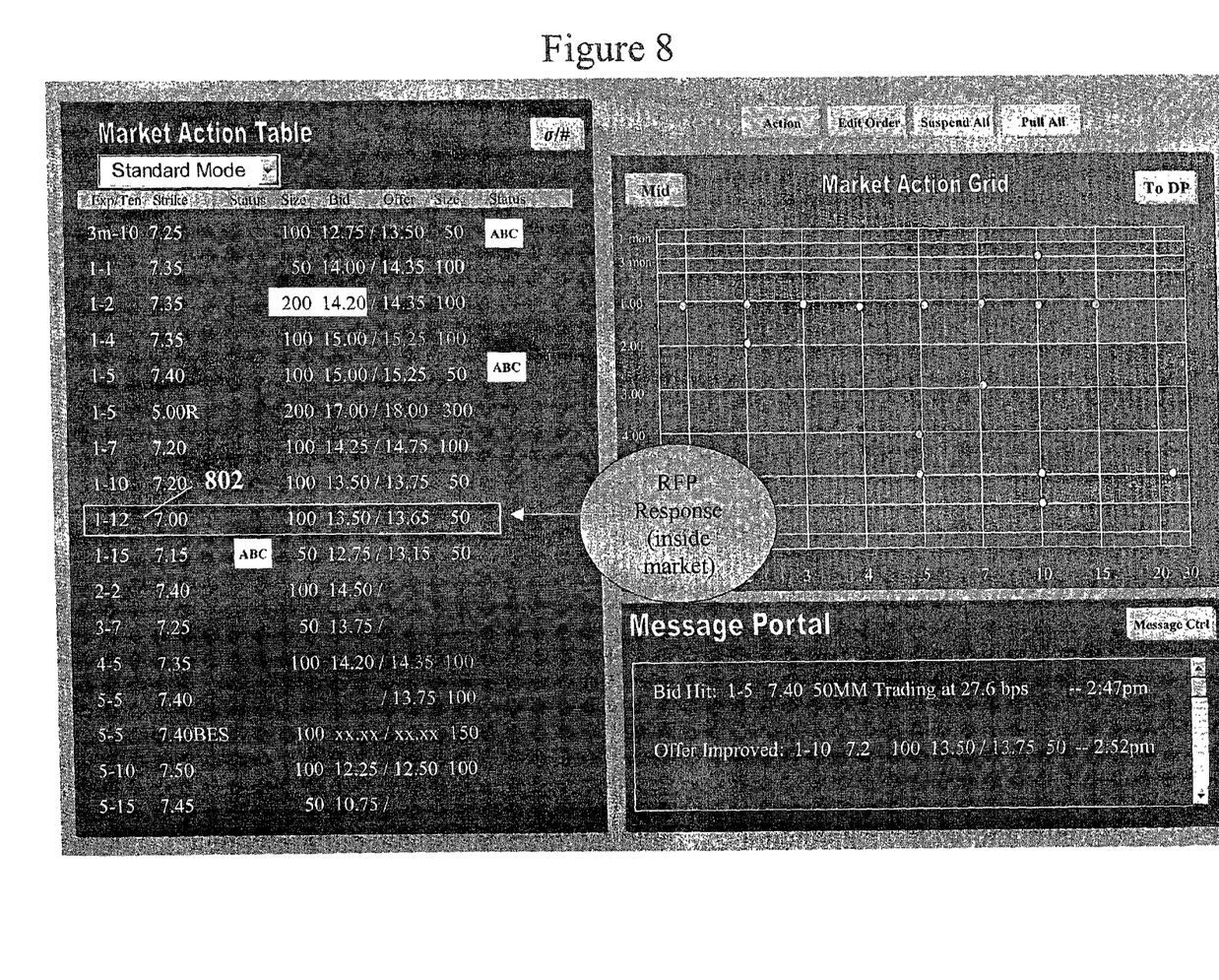
FIG. 8 shows an exemplary market action screen of a trader display showing responses which have migrated to the general market.

The system broadcasts RFP responses to the requestor and other responders (126 FIG. 1B). The system preferably also broadcasts the responses to the requestor's and responder's trading groups. An example of a set of RFP response orders 602, 604, 606 is shown in FIG. 6. Preferably, the responses are only visible to the requestor and those who responded to the RFP (i.e. they only appear in the MAT's 200 and Message Portals 204 of the requestor and responders) as well as their trading groups. The RFP responses 602, 604, 606 appear in the RFP table mode 414 of MAT 200. The RFP responses preferably are displayed below the associated RFP structure indicated 402 on MAT 200. The MAT 200 preferably shows the full stack of RFP responses (as compared to the "best" RFP response).

As shown in FIG. 1B, in the preferred embodiment, the RFP process has two phases: a Response Phase 140 and an Action Phase 142. The Response Phase 140 preferably begins as soon as the RFP is submitted. The Response Phase 140 ends when: (i) the requestor (or requestor's trading group) trades 131 on any of the responses—preferably for any size trade); (ii) the requestor's trading group responds to the requestor's own RFP; or (iii) the Response Time 408, 410 expires (130 FIG. 1B). The Response Phase 140 preferably does not end based on a requestor's (or a requestor's trading group's) query of an ABC response. The Action Phase 142 begins as soon as the Response Phase 140 ends. The Action Phase 142 ends when the Action Time (702 FIG. 7) times out 136.

During the Response Phase 140 and Action Phase 142, only the responders and the requestor see the RFP response orders (602, 604, 606) for a given RFP. As noted above, this display may be extended to the responders' and/or requestors' trading groups.

During the Response Phase 140 only the RFP requestor (or the RFP requestor's trading group) can trade on (i.e. hit bids/lift offers). In a preferred embodiment only the RFP requestor may query the RFP response orders (128 FIG. 1B). Responses do not get matched during the Response Phase 140 and are permitted to cross. During the Response Phase 140, traders outside the requestor's trading group are only permitted to submit responses to the RFP and edit or pull their responses. In an alternate embodiment, the time that users have to respond to the RFP and the time that the requestor has exclusive rights to trade on the RFP responses need not be the same.

After the Response Phase 140 ends, the Action Phase 142 begins during which both requestors and responders (as well as their trading groups) may trade on the RFP response orders. In the preferred embodiment the Action Time (702 FIG. 7) is set as a system default but in alternate embodiments the requestor is allowed to set the Action Time.

When the Action Phase 142 begins, the system first matches 132 any crossed responses with agreeable credit limits. If the bid is higher than the offer, the system preferably averages the price. In an alternate embodiment, the system will give preference to whoever entered the response to RFP first. Thus, the second responder's price (if better than the first responder's price from the first responder's point of view) is used to match the order. Other methods of determining prices of crossed orders may be used. Once acceptable crossed orders are matched, all responders to the structure, as well as the requestor, and the responders' and requestor's trading groups, are allowed to act, i.e. trade and query, on open responses with equal priority 134. Standard trading rules apply. Preferably, no new responses to the RFP are allowed during the Action Phase 142.

Once the Action Phase 142 ends 136, all lines in the RFP table related to the RFP (e.g. 402, 602, 604 and 606 FIG. 6) are removed including the RFP structure header (e.g. 402). The remaining RFP response orders migrate 138 to the general market and become available to be traded on by other system users authorized to trade and/or query the instruments (shown as 802 in FIG. 8). If there already exists a standard mode stack for the given RFP structure, the RFP responses are placed in the stack based on standard parameters, e.g. price, status, last time of edit. If there is no existing stack, the RFP responses become standard mode orders for the structure. Sub-market size RFP responses preferably become standard orders after the Action Phase 142 ends.

The invention is suited to a variety of financial instruments including those listed in Tables 1A-C, as well as stocks and bonds. Moreover, the invention also applies to contracts based upon the exchange of any commodity, such as contracts for the exchange of bandwidth, real estate, electricity, processing power, freight transportation, etc. Thus, the term "financial instruments" as used herein includes contracts based upon such commodities or services.

Although the specification and illustrations of the invention contain many particulars, these should not be construed as limiting the scope of the invention but as merely providing an illustration of the preferred embodiments of the invention. Thus, the claims should be construed as encompassing all features of patentable novelty that reside in the present invention, including all features that would be treated as equivalents by those skilled in the art.

What is claimed is:

1. A method of using a computer system to electronically trade financial instruments among a plurality of traders, including a requestor and two or more responders, comprising:
   receiving at said computer system a request for proposal ("RFP") on a financial instrument from said requester, said requester associated with a requestor workstation, said RFP comprises a two-way structure which allows for both offers and bids but not comprising an offer to trade that can be hit or lifted and;
   receiving at said computer system two or more responses to said RFP, each said responder associated with a responder workstation, each said responder workstation providing at least one said response;
   said computer system transmitting said responses to said requestor workstation;
   said computer system allowing said requestor to trade on said responses during a first period, each trader of said plurality of traders not being allowed to trade on said responses during said first period unless said trader comprises said requestor; and
   at the expiration of said first period, said computer system allowing said responders to trade on said responses during a second period, each trader of said plurality of traders not being allowed to trade on said responses during said second period unless said trader comprises said requestor or said responders.

2. The method of claim 1 further comprising said computer system matching orders at the expiration of said first period and before allowing said responders to trade on said responses.

3. The method of claim 2 wherein said orders are associated with a bid price or an offer price, said matching orders process further comprising said computer system matching crossed orders in which the highest bid price is higher than the lowest offer price.

4. The method of claim 1 wherein any responses which have not been traded on at the end of said second period are migrated by said computer system to a general market.

5. The method of claim 1, wherein said requestor and said responders are associated with trading groups, said method further comprising said computer system transmitting said responses to said trading group associated with said requestor and each trading group associated with said responders, each trader of said plurality of traders not receiving said responses unless said trader comprises a trader in said trading group associated with said requestor or at least one trading group associated with said responders.

6. The method of claim 5 further comprising said computer system allowing traders in said trading group associated with said requestor to trade on said responses during said first period, each trader of said plurality of traders not being allowed by said computer system to trade on said responses during said first period unless said trader comprises a trader in said trading group associated with said requestor.

7. The method of claim 6 further comprising said computer system allowing traders in each said trading group associated with said responders to trade on said responses during said second period.

8. A method of using a computer to electronically trade financial instruments among a plurality of traders, including a requestor and two or more responders, each trader of said plurality of traders being associated with one or more trading groups, said method comprising:
   receiving at said computer system a request for proposal ("RFP") on a financial instrument from a requestor associated with a requestor workstation, said RFP comprising a two-way structure which allows for both offers and bids but not comprising an offer to trade that can be hit or lifted;
   during a first response period, receiving at said computer system two or more responses to said RFP from said responders, each responder associated with a responder workstation, each said responder providing at least one said response;
   said computer system transmitting said responses to said requestor;
   said computer system allowing said requestor to trade on said responses during a first exclusivity period, each trader of said plurality of traders not being allowed to trade on said two or more responses during said first exclusivity period unless each said trader is associated with one or more trading groups associated with said requestor, said first response period and said first exclusivity period being allowed to overlap; and
   at the expiration of said first exclusivity period, said computer system allowing said responders to trade on said responses during a second exclusivity period, each trader of said plurality of traders not being allowed to trade on said responses during said second exclusivity period unless each such trader is associated with one or more trading groups associated with said requestor or is associated with one or more trading groups associated with said responders.

9. The method of claim 8 wherein each trader of said plurality of traders is associated with one or more tradeable structures stored in said computer system, said tradeable structures for each said trader being a function of potential traders to a trade.

10. The method of claim 8 wherein said first exclusivity period and said second exclusivity period are co-terminus.

11. The method of claim 8 further comprising said computer system migrating said responses to a general market at the expiration of said second exclusive period.

12. A system for electronically trading financial instruments among a plurality of traders, including a requestor and two or more responders, comprising:

a first workstation associated with a requestor, said first workstation adapted to accept requests for proposal ("RFP") from said requestor, said RFP comprising a two-way structure which allows for both offers and bids but not comprising an offer to trade that can be hit or lifted;

a plurality of responder workstations each associated with a responder, each said responder workstation adapted to accept responses to said RFPs from at least one said responder;

a server coupled to said first workstation and each said responder workstation, said server adapted to:

receive said RFP from said first workstation;

receive two or more responses from two or more responder workstations;

transmit said responses to RFP to said first workstation and each of said plurality of responder workstations from which said server received a response, each workstation of said plurality of responder workstations not displaying said two or more responses to RFP unless said responder workstation sent a response to said RFP;

allow said requestor to trade on said responses to RFP during a first period, each trader of said plurality of traders not being allowed to trade on said response during said first period unless each said trader comprises said requestor; and at the end of said first period, allow said responders to trade on said responses during a second period, each trader of said plurality of traders not being allowed to trade on said responses during said second period unless each said trader comprises said requestor or said responders.

13. The system of claim 12 wherein certain of said first workstation and said plurality of responder workstations functions are implemented in said server.

14. A system for electronically trading financial instruments among a plurality of traders, comprising a server adapted to:

receive a request for proposal ("RFP") on a financial instrument from a requestor, said RFP comprising a two-way structure which allows for both offers and bids but not comprising an offer to trade that can be hit or lifted;

receive two or more responses to said RFP from two or more responders, each said responder providing at least one said response;

transmit said two or more responses to said requestor and said two or more responders, each trader of said plurality of traders not receiving said two or more responses unless each said trader comprises said requestor or one or more responders;

allow said requestor to trade on said responses during a first period, each trader of said plurality of traders not being allowed to trade on said response during said first period unless each said trader comprises said requestor; and allow said two or more responders to trade on said responses during said second period at the expiration of said first period, each trader of said plurality of traders not being allowed to trade on said response during said second period unless each said trader comprises said requestor or said two or more responders.

15. A method of using a computer system to electronically trade financial instruments among a plurality of traders, comprising:

receiving at said computer system a request for proposal ("RFP") on a financial instrument from a requestor, said RFP comprising a two-way structure which allows for both offers and bids but not comprising an offer to trade that can be hit or lifted;

receiving at said computer system two or more responses to said RFP from two or more responders, each said responder providing at least one said response;

said computer system transmitting said two or more responses to said requestor;

said computer system allowing said requestor to trade on said two or more responses during a first period, each said trader of said plurality of traders not being allowed to trade on said two or more responses during said first period unless said trader comprises said requestor; and at the expiration of said first period, said computer system allowing said two or more responders to trade on said two or more responses during a second period, each said trader of said plurality of traders not being allowed to trade on said two or more responses during said second period unless said trader comprises said requestor or said two or more responders.

\* \* \* \* \*